United States Patent
Froc et al.

(10) Patent No.: US 9,455,781 B2
(45) Date of Patent: Sep. 27, 2016

(54) METHOD AND DEVICE FOR DETERMINING WHETHER A CONFIGURATION OF AN OPTICAL TRANSMISSION INTERFACE HAS TO BE ADJUSTED

(71) Applicant: MITSUBISHI ELECTRIC CORPORATION, Chiyoda-ku (JP)

(72) Inventors: Gwillerm Froc, Rennes (FR); Olivier Weppe, Rennes (FR)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 38 days.

(21) Appl. No.: 14/381,368

(22) PCT Filed: Feb. 20, 2013

(86) PCT No.: PCT/EP2013/053343
§ 371 (c)(1),
(2) Date: Aug. 27, 2014

(87) PCT Pub. No.: WO2013/127669
PCT Pub. Date: Sep. 6, 2013

(65) Prior Publication Data
US 2015/0037027 A1  Feb. 5, 2015

(30) Foreign Application Priority Data
Feb. 28, 2012 (EP) ..................... 12157240

(51) Int. Cl.
H04B 10/079 (2013.01)
H04B 10/2507 (2013.01)
H04J 14/02 (2006.01)

(52) U.S. Cl.
CPC ...... *H04B 10/0795* (2013.01); *H04B 10/2507* (2013.01); *H04J 14/0221* (2013.01)

(58) Field of Classification Search
None
See application file for complete search history.

(56) References Cited

U.S. PATENT DOCUMENTS

2002/0176129 A1  11/2002  Dinu et al.
2003/0095304 A1   5/2003  Dorring et al.

FOREIGN PATENT DOCUMENTS

WO  03 042722  5/2003

OTHER PUBLICATIONS

Phillips, A. J., et al., "Optically preamplified pulse-position modulation for fibre-optic communication systems", IEE Proceedings: Optoelectron, vol. 143, No. 2, pp. 153-159, (Apr. 26, 1996) XP006006643.
International Search Report and Written Opinion Issued Apr. 9, 2013 in PCT/EP13/053343 Filed Feb. 20, 2013.

*Primary Examiner* — Darren E Wolf
(74) *Attorney, Agent, or Firm* — Oblon, McClelland, Maier & Neustadt, L.L.P

(57) ABSTRACT

A method for determining whether a configuration of an optical transmission interface of a first device has to be adjusted for transmitting an optical signal to a second device via an optical band-pass filter, the second device including an optical reception interface configured to enable receiving optical signals output by said optical band-pass filter and transmitted by the first device on a carrier wavelength when the carrier wavelength is in the passband of the optical band-pass filter. A monitoring device performs: obtaining an information representative of a time drift between successive symbols of an optical signal received by the second device, from the first device, via the optical band-pass filter; and determining whether the configuration of the optical transmission interface of the first device has to be adjusted, on the basis of the information representative of the time drift.

14 Claims, 5 Drawing Sheets

Figure 1:
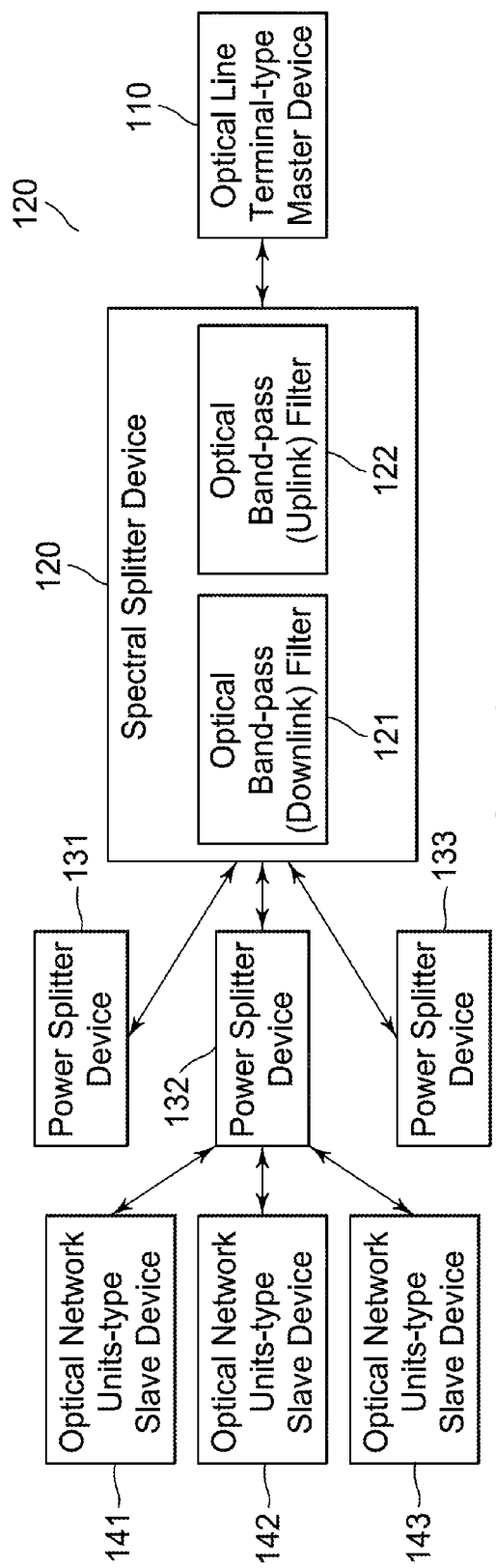

METHOD AND DEVICE FOR DETERMINING WHETHER A CONFIGURATION OF AN OPTICAL TRANSMISSION INTERFACE HAS TO BE ADJUSTED

The present invention generally relates to optical networks and more particularly to configuring the carrier wavelength to be used by a first device to communicate with a second device, when an optical band-pass filter is present on the path from the first device to the second device.

Optical networks, and more particularly passive optical networks, are increasingly used to give network access to residential or office gateways or to ensure mobile backhauling for instance.

In an attempt to increase the number of users to be served by one access system to the network, wavelength or frequency division multiplexing technologies have been developed. These technologies take advantage of multiplexing several optical signals using different carrier wavelengths or frequencies on a single optical fiber. Even though some user terminals may share the same carrier wavelength or frequency, a wavelength or frequency splitter is typically used to separate the different wavelengths, or frequencies, in order to increase the number of simultaneous optical transmissions. The wavelength or frequency splitter is typically placed between the user terminals and a terminal providing access to the rest of the network. For instance this latter terminal provides access to a core or metropolitan network. Different techniques can be used to achieve the wavelength or frequency splitting. We can cite thin films based systems, interference cavities as AWG (Array Wavelength Gratings) and FBG (Fiber Bragg Gratings).

The wavelength or frequency splitter then comprises several optical band-pass filters, for each direction of communications. It is used to filter and combine optical signals issued by the user terminals toward the terminal giving access to the core or metropolitan network. In the other direction, it is used to filter and spectrally split the optical signals issued by the terminal giving access to the core or metropolitan network.

The difficulty in such an arrangement is to configure the transmission interfaces of the terminals. Indeed, these transmission interfaces shall be configured so that the carrier wavelengths, or frequencies, effectively used substantially match the effective passband of the respective optical band-pass filters with which they are associated.

It is known that such wavelength or frequency splitters are used in a temperature-controlled environment. This allows insuring the stability of the passband of the optical band-pass filters. Otherwise, the passband would vary as a function of the temperature, especially the value of the nominal wavelength or frequency. This known technique however requires that the wavelength or frequency splitters be powered, or to be placed in an environment in which the temperature is controlled (e.g. air conditioned place) or in an athermanous (also referred to as athermal) package. For flexibility in the network deployment, cost and maintenance considerations, it is desirable to get rid of this constraint.

It can in addition be noticed that the terminals are also subject to similar variations of their transmission configurations, as a function of the temperature, when they are not in such temperature-controlled environments.

It can in addition be noticed that the terminals may also not be aware of the carrier wavelengths effectively used for given configurations of their respective transmission interfaces. Indeed, each terminal uses a set of configuration parameters that may not be indicative of the carrier wavelength effectively used. Modifying this set of configuration parameters involves modifying the carrier wavelength, but with no indication of the effective value of the carrier wavelength.

Moreover, when using optical band-pass filters of flat-top type, it is desirable to determine whether the carrier frequency is in the passband of the filter but close to the low or high cut-off frequency, or at least that it is getting closer to the low or high cut-off frequency. Indeed, in such a case, a slight variation of the temperature may result in a significant attenuation of the optical signal at the receiver. Because of the flat-top character of the optical band-pass filter, checking the evolution of the attenuation of the optical signal at the receiver is helpless to detect the occurrence of such a situation.

It is desirable to overcome the aforementioned problems which occur in optical networks. In particular, it is desirable to provide a solution that allows configuring the optical transmission interfaces of devices communicating via an optical band-pass filter for which the effective passband is a priori unknown. It is also desirable to provide a solution that allows configuring the optical transmission interfaces of devices communicating via an optical band-pass filter for which the effective passband is temperature dependent, although the width of the passband may not be temperature dependent.

It is also desirable to provide a solution that allows configuring the optical transmission interfaces of devices, communicating via an optical band-pass filter, for which the effective carrier wavelengths for given respective configurations are temperature dependent.

It is furthermore desirable to provide a solution that allows detecting a detuning of the optical transmission interfaces of devices communicating via an optical band-pass filter of flat-top type compared to the effective passband of the optical band-pass filter, and more particularly compared to the nominal wavelength of the optical band-pass filter.

It is furthermore desirable to provide an efficient and cost-effective solution to the aforementioned problems.

To that end, the present invention concerns a method, called monitoring method, for determining whether a configuration of an optical transmission interface of a first device has to be adjusted for transmitting an optical signal to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter. The method is such that a monitoring device performs: obtaining an information representative of a time drift between successive symbols of an optical signal received by the second device, from the first device, via the optical band-pass filter; and determining whether the configuration of the optical transmission interface of the first device has to be adjusted, on the basis of said information representative of the time drift.

Such a time drift is representative of a variation of group delay, or phase delay also referred to as phase shift, in the transmission of the optical signals via the optical band-pass filter due to a misalignment of the carrier wavelength with the nominal frequency of the optical band-pass filter. The group delay is an indication of the time delay of the amplitude envelope of the sinusoidal components of the symbol through the optical band-pass filter, and is a function of frequency for each component. Phase delay is a similar indication for the time delay of the phase of each sinusoidal component. Thus, by obtaining the information representative of the time drift between successive symbols, the monitoring device is able to detect that the configuration of the optical transmission interface of the first device has to be adjusted, even when an optical pass-band filter of flat-top type is used between the first device and the second device.

According to a particular feature, the monitoring device performs: receiving, from the second device, information representative of instants at which extremes of signal strength are detected by the second device in at least two successive symbols of the optical signal received by the second device, from the first device, via the optical band-pass filter; determining at least one time period between said instants at which extremes of signal strength are detected; and, obtaining the information representative of the time drift on the basis of the determined at least one time period.

Thus, as such extremes represent noticeable points in a signal temporal shape for the symbols received by the second device, determining of a possible time drift is enabled. Two successive symbols are sufficient to obtain the information representative of the time drift, when the time period between instants at which said extremes of signal strength exist in the optical signal as transmitted by the first device is a priori known. At least three successive symbols are needed when such time period between instants at which said extremes of signal strength exist in the optical signal as transmitted by the first device is a priori unknown.

According to a particular feature, the second device performs oversampling of the symbols of the optical signal received by the second device, from the first device, via the optical band-pass filter.

Thus, by performing oversampling, such extremes, or approximation thereof, can be easily detected by the second device.

According to a particular feature, the first device successively transmits plural copies of plural symbols, each copy being delayed from the preceding copy by a submultiple of the symbol duration, and the second device performs sampling of the plural copies in the optical signal received by the second device, from the first device, via the optical band-pass filter; furthermore, the second device performs detecting at least one extreme of signal strength among said plural copies for each symbol.

Thus, by transmitting plural copies of plural symbols with a delay between successive copies, the extremes of signal strength, or approximation thereof, can be easily detected by the second device, whereas the clock frequency necessary to detect such extremes is limited. The design of the second device is therefore cost-effective.

According to a particular feature, the first device successively transmits plural copies of each symbol, and the second device performs sampling of the plural copies in the optical signal received by the second device, from the first device, via the optical band-pass filter; furthermore, the second device performs detecting at least one extreme of signal strength among said plural copies for each symbol.

Thus, by transmitting plural copies of plural symbols and by applying a delay when sampling the optical signal, the extremes of signal strength, or approximation thereof, can be easily detected by the second device, whereas the clock frequency necessary to detect such extremes is limited. The design of the second device is therefore cost-effective.

According to a particular feature, the monitoring device receives from the second device an information indicating, among a sequence of symbol copies, the index of the copy containing the extreme of signal strength detected by the second device.

Thus, the number of copies per symbol being known by the first device, the second device and the monitoring device, and by transmitting such an index, the amount of overhead information exchanged is limited.

According to a particular feature, said extremes are the signal strength maximum values for the respective symbols.

Thus, such extremes of signal strength are easily detected and easily distinguished from other noticeable points in the signal temporal shape for the symbols received by the second device.

According to a particular feature, the monitoring device performs: receiving, from the second device, information representative that a control voltage of an oscillator of a clock recovery unit driving an analogue-to-digital converter of the second device transiently varies when the second device receives the optical signal from the first device via the optical band-pass filter; and obtaining the information representative of the time drift on the basis of transient variations in the control voltage of the oscillator of the clock recovery unit.

Thus, as transient variations in the control voltage of the oscillator of the clock recovery unit, such as charge pump voltage in a Phase-locked loop, represent variations of the time period between successive transitions in the received optical signal, determining of a possible time drift is enabled.

According to a particular feature, the monitoring device performs: detecting that no information has been received during a predetermined time period from the second device for enabling obtaining the information representative of the time drift; and requesting the first device to transmit to the second device at least one specific symbol via the optical band-pass filter.

Thus, the monitoring of the appropriateness of the configuration of the optical transmission interface of the first device can be monitored using symbols transmitted by the first device during communications with the second device, and in idle communication periods, the monitoring device ensures that the appropriateness of the configuration of the optical transmission interface of the first device is maintained.

The present invention also concerns a method for configuring an optical transmission interface of a first device for transmitting an optical signal to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, wherein a monitoring device performs the aforementioned monitoring method.

Thus, the configuration of the optical transmission interface of the first device is adjusted according to the detected time drift, and the transmission of optical signals from the first device to the second device is improved.

According to a particular feature, the monitoring device performs beforehand: obtaining an information representative of a signal temporal shape corresponding to a symbol of the optical signal received by the second device, from the first device, via the optical band-pass filter; configuring the optical transmission interface of the first device, on the basis of said information representative of the signal temporal shape.

Thus, thanks to the information representative of the signal temporal shape for one symbol, a frequency shift reference between the carrier frequency and the nominal frequency of the optical band-pass filter can be obtained and then, the evolution of the frequency shift can be monitored with the aforementioned time drift and be adjusted with more limited resources.

According to a particular feature, the monitoring device performs beforehand: obtaining an information indicating whether an energy level of the optical signal received by the second device over an integration period increased, decreased or was stable when comparing said energy level and an energy level of the optical signal received by the second device over a preceding integration period; configuring the optical transmission interface of the first device, on the basis of said information.

Thus, thanks to the information related to the energy level over integration periods, a frequency shift reference between the carrier frequency and the nominal frequency of the optical band-pass filter can be obtained and then, the evolution of the frequency shift can be monitored with the aforementioned time drift and be adjusted with more limited resources.

According to a particular feature, the monitoring device performs beforehand: obtaining measurements of energy level of the optical signal received by the second device over an integration period, for plural carrier frequencies; and configuring the optical transmission interface of the first device, on the basis of said measurements.

Thus, thanks to these measurements of energy level, the configuration of the optical transmission interface of the first device can be cost-effectively setup so that the carrier wavelength is in the passband or bandwidth of the optical band-pass filter. The frequency shift between the carrier frequency and the nominal frequency of the optical band-pass filter can then be monitored thanks to the aforementioned signal temporal shape and be refined.

The present invention also concerns a device, called monitoring device, for determining whether a configuration of an optical transmission interface of a first device has to be adjusted for transmitting an optical signal to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter. The monitoring device is such that it comprises: means for obtaining an information representative of a time drift between successive symbols of an optical signal received by the second device, from the first device, via the optical band-pass filter; and means for determining whether the configuration of the optical transmission interface of the first device has to be adjusted, on the basis of said information representative of the time drift.

The present invention also concerns a device, called configuring device, for configuring an optical transmission interface of a first device for transmitting an optical signal to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter. The configuring device is such that it comprises the aforementioned monitoring device.

The present invention also concerns a computer program that can be downloaded from a communication network and/or stored on a medium that can be read by a computer and run by a processor. This computer program comprises instructions for implementing the aforementioned methods in any one of their various embodiments, when said program is run by the processor. The present invention also concerns an information storage means, storing such a computer program.

Figure 2:
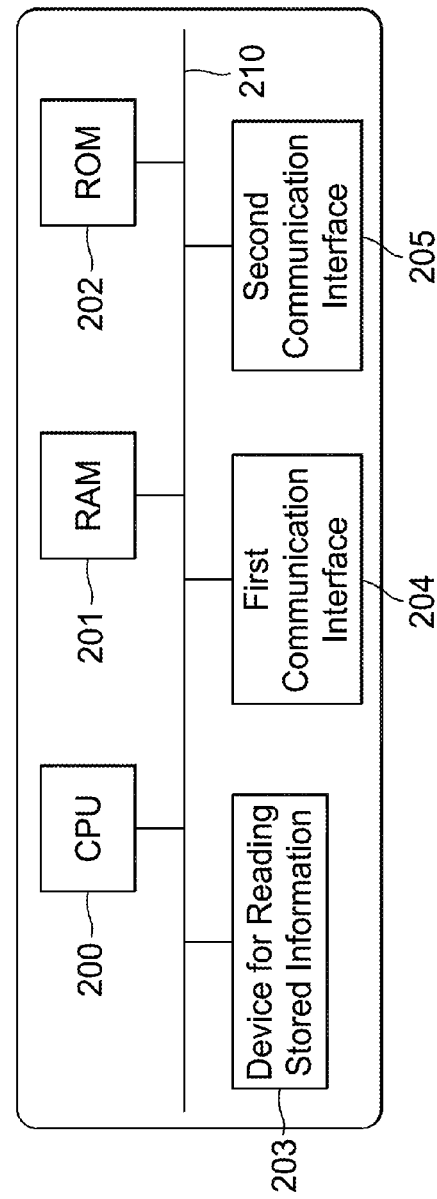
Figure 3A:
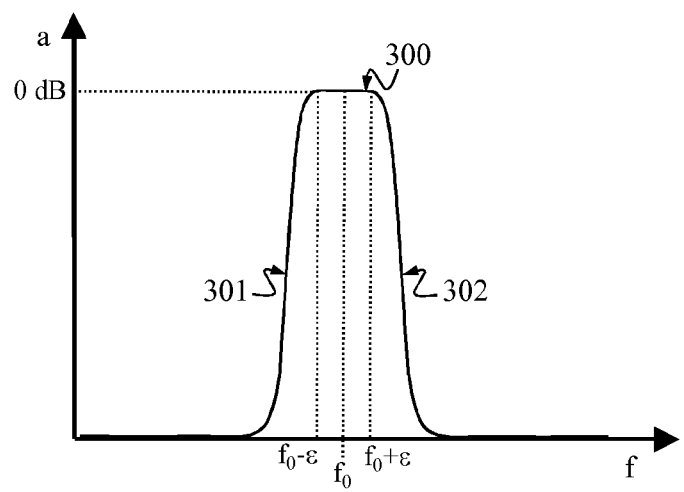
Figure 3B:
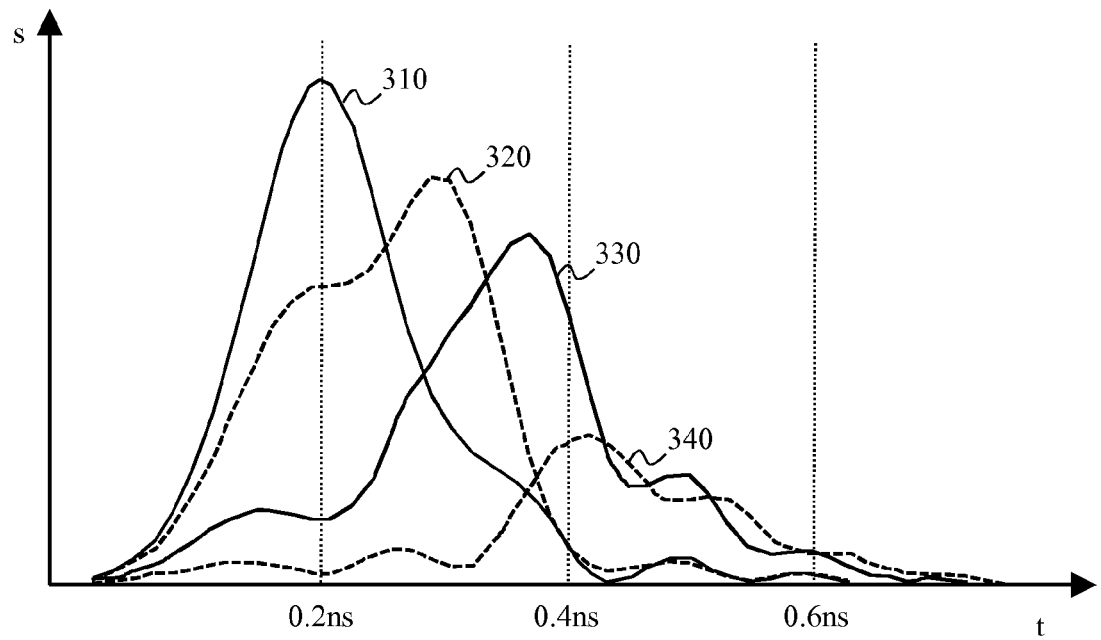
Figure 4:
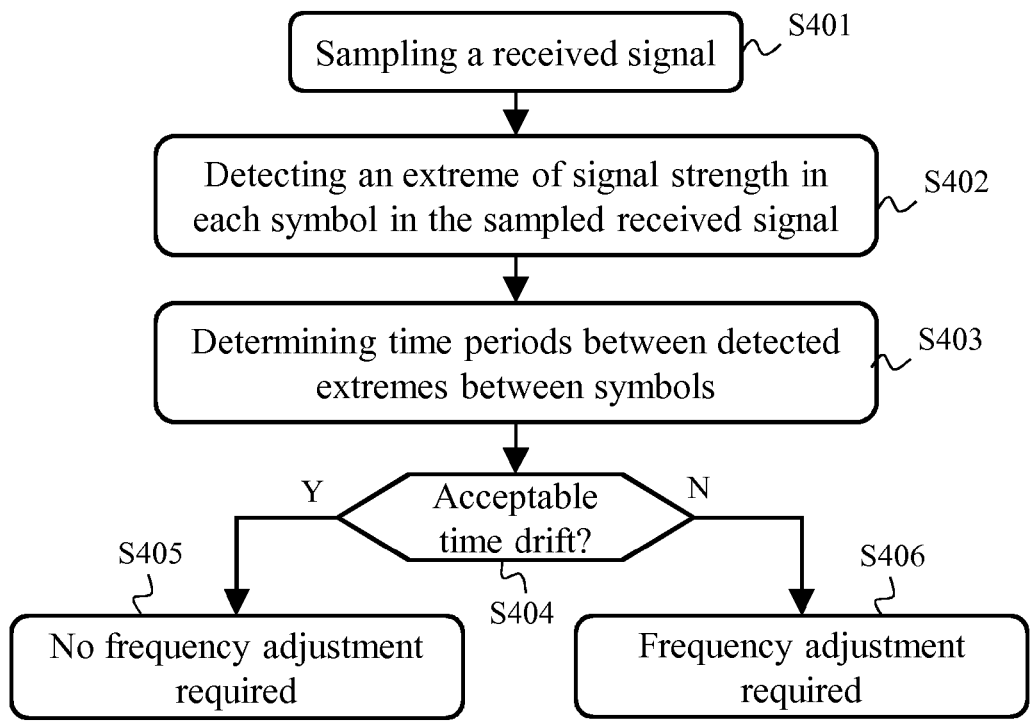
Figure 5:
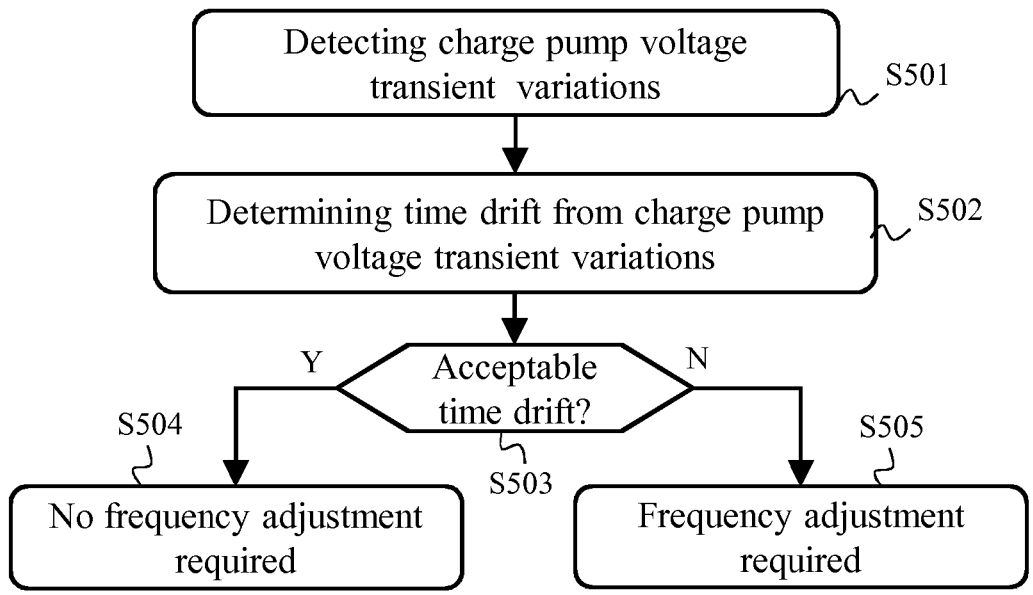
Figure 6:
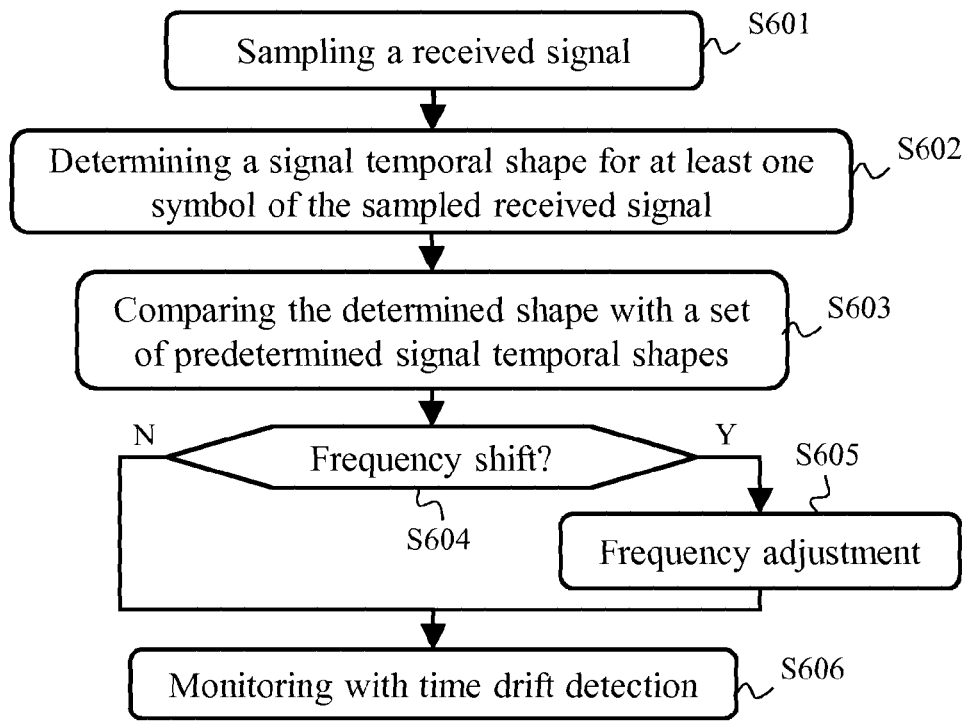
Figure 7:
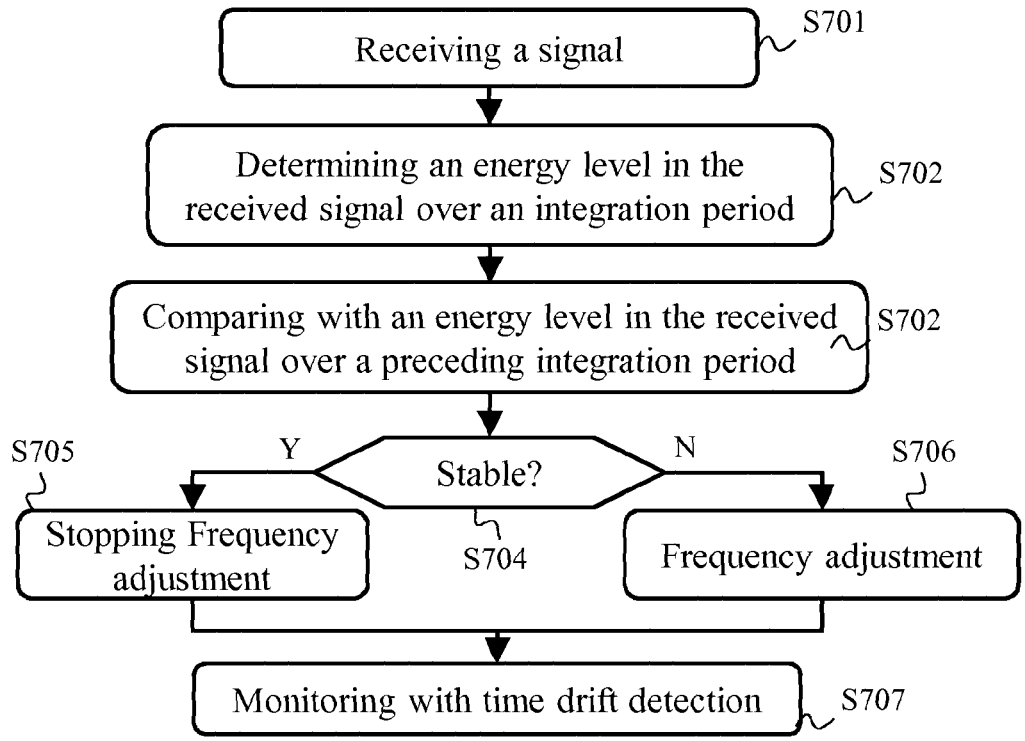
Figure 8:
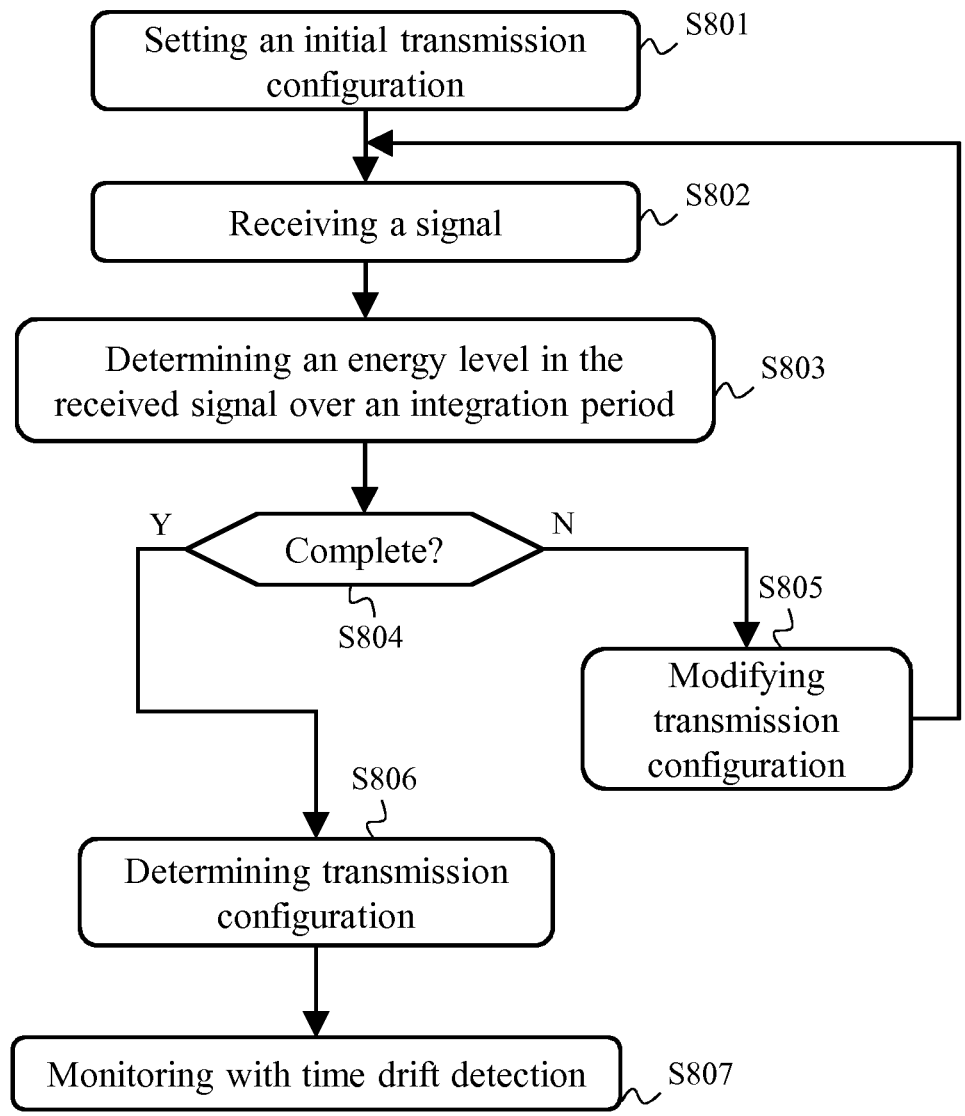

The characteristics of the invention will emerge more clearly from a reading of the following description of an example of embodiment, said description being produced with reference to the accompanying drawings, among which:

FIG. 1 schematically represents an architecture of a passive optical network in which the present invention may be implemented;

FIG. 2 schematically represents an architecture of an optical communication device of the passive optical network;

FIG. 3A schematically represents a signal attenuation of an optical band-pass filter of the passive optical network;

FIG. 3B schematically represents signal temporal shapes corresponding to an impulse response of the optical band-pass filter;

FIG. 4 schematically represents a first algorithm for determining whether a configuration of an optical transmission interface of an optical communication device has to be adjusted;

FIG. 5 schematically represents a second algorithm for determining whether the configuration of the optical transmission interface of the optical communication device has to be adjusted;

FIG. 6 schematically represents a first algorithm for configuring the optical transmission interface of the optical communication device;

FIG. 7 schematically represents a second algorithm for configuring the optical transmission interface of the optical communication device;

FIG. 8 schematically represents a third algorithm for configuring the optical transmission interface of the optical communication device.

The invention is detailed hereafter in the context of a passive optical network. It has to be however understood that the present invention is not limited to such a context, and may be implemented in the general scope of a transmission of optical signals from a first optical communication device to a second optical communication device via an optical band-pass filter.

It has to be noticed that, since wavelength and frequency are tied together through a direct inverse relationship, these two terms are indifferently used by the one skilled in the art, as they refer to the same concept.

The general principle of the present invention lies in detecting a time drift between successive symbols of a received optical signal and in determining whether the configuration of the optical transmission interface of the first device has to be adjusted, as a function of whether such a time drift is detected or not. Indeed, even though no attenuation of the received optical signal may be detected when the carrier frequency of the optical signal is in the passband of the filter, the frequency shift between the nominal frequency of the filter and the carrier frequency leads to a variation of group delay, or phase delay or phase shift of the signal, which in turn leads to a time drift between successive symbols of a received optical signal.

FIG. 1 schematically represents an architecture of a passive optical network 100 in which the present invention may be implemented. The passive optical network 100 comprises a master device 110, a plurality of slave devices 141, 142, 143, and a spectral splitter device 120. The slave devices 141, 142, 143 are interconnected with the master device 110 via the spectral splitter device 120. Power splitters, as described hereafter, may be placed between the slave devices and the spectral filter device 120 in order to increase the number of slave devices that can be interconnected with the master device 110. All the interconnections of the passive optical network 100 are performed by using optical fiber.

In the context of the passive optical network 100, the slave devices 141, 142, 143 are of ONU (Optical Network Units) type. ONUs are typically intended to be located at the end-user household. In the context of the passive optical network 100, the master device 110 is of OLT (Optical Line Terminal) type. It enables ONUs to access a core or metropolitan network (not shown).

The slave devices 141, 142, 143 may be connected to the spectral splitter device 120 via a power splitter device 132. The power splitter device 132 is a passive splitter that separates the input signal, in the downlink direction, into a plurality of corresponding signals which power is divided by the number of links towards the slave devices 141, 142, 143. The signals output by the power splitter device 132, on each link in the downlink direction, contain the same information as the input signal, the power splitter device 132 having only impact on the power of the signals.

Other slave devices may be connected to the spectral splitter device 120 via power splitter devices 131, 133. Each power splitter device 131, 132, 133, and the slave devices connected to, form a network of PON (Passive Optical Network) type with the OLT. The PONs operate on respective wavelength bands, as filtered by the spectral splitter device 120. To achieve this, the spectral splitter device 120 comprises a pair of optical band-pass filters for each PON, aiming at filtering respective wavelength bands, and thus enabling the spectral splitter device 120 to perform WDM (Wavelength Division Multiplexing).

Therefore, as shown on FIG. 1, the spectral splitter device 120 comprises optical band-pass filters 121 and 122 dedicated to the transmissions over the PON of the power splitter device 132 and its associated slave devices 141, 142, 143. The first filter 122, called hereinafter uplink filter, is in charge of filtering the optical signals in the uplink direction, i.e. from the slave devices 141, 142, 143 to the master device 110. The second filter 121, called hereinafter downlink filter, is in charge of filtering the optical signals in the downlink direction, i.e. from the master device 110 to the slave devices 141, 142, 143. Each filter 121, 122 is an optical band-pass filter defined by a nominal wavelength, also referred to as centre wavelength, as well as a bandwidth or passband.

For a considered uplink or downlink direction, all the filters of the spectral splitter device 120 have preferably the same bandwidth value and are preferably spaced by a fixed spectral distance. However, the nominal wavelengths of the filters, and therefore the effective passband of the filters, are a priori unknown. The spectral splitter device 120 being preferably passive, the nominal wavelengths of the filters, and therefore the effective passband of the filters, may vary as a function of the temperature of the spectral splitter device 120. Typically, for a temperature in a range from −40° C. to 80° C., the nominal wavelength, and therefore the effective passband, may vary by ±0.6 nm, which corresponds to a frequency shift over a frequency band of approximately 200 GHz.

It has to be noticed that, the band-pass filters being designed upon the same constraints, the bandwidth or passband value of the filters and the spectral distance between the filters are substantially independent of the temperature variations. In addition, for the same reasons, the effective carrier wavelength corresponding to a given configuration of the optical transmission interface of either a slave device 141, 142, 143 or the master device 110 may not be known.

Therefore, the slave devices 141, 142, 143 need to be configured for transmitting optical signals in the uplink direction on carrier frequencies that are in the bandwidth or passband of the uplink filter 122. In addition, the master device 110 needs to be configured for transmitting optical signals in the downlink direction on a carrier frequency that is in the bandwidth or passband of the downlink filter 121. When the uplink filter 122 and/or the downlink filter 121 are flat-top filters, carrier frequencies that are in the bandwidth or passband of the concerned filter but close to their cut-off frequencies should be avoided. Indeed, such situations need to be prevented and configurations of the optical transmission interfaces need to be consequently adjusted in order to avoid, due to temperature variations, a sudden attenuation of the received optical signals. It is at least needed to detect when the carrier frequency is in the bandwidth or passband of the concerned filter but getting close to one of the cut-off frequencies.

In order to determine whether a configuration of an optical transmission interface of a first device has to be adjusted for transmitting an optical signal to a second device via an optical band-pass filter, the second device having an optical reception interface configured to enable receiving optical signals output by said optical band-pass filter and transmitted by the first device on a carrier wavelength when said carrier wavelength is comprised in the passband of the optical band-pass filter, it is proposed to monitor a time drift between successive symbols of the received optical signal. A monitoring device is thus implemented, which performs: obtaining an information representative of a time drift between successive symbols of an optical signal received by the second device, from the first device, via the optical band-pass filter; and determining whether the configuration of the optical transmission interface of the first device has to be adjusted, on the basis of said information representative of the time drift.

The monitoring device may be implemented in the second device, which receives the optical signals. In this case, the second device instructs the first device to reconfigure its optical transmission interface, on the basis of the time drift.

The monitoring device may in a variant be implemented in the first device, which transmits the optical signals. In this case, the second device provides the first device with measurement results or information representative of a time drift, the first device determines accordingly whether its optical transmission interface has to be adjusted and performs the adjustment whenever necessary.

The monitoring device may in another variant be implemented in a third device, connected to the first device and second device. In this case, the second device provides the third device with measurement results or information representative of a time drift, the third device determines accordingly whether the optical transmission interface of the first device has to be adjusted and instructs the first device to reconfigure its optical transmission interface, on the basis of the time drift.

In the context of the passive optical network 100, the monitoring device may be implemented in the master device 110 for monitoring downlink and uplink optical transmissions. In yet another variant, the monitoring device may be implemented in the slave devices 141, 142, 143 for monitoring downlink and uplink optical transmissions.

FIG. 2 schematically represents an architecture of an optical communication device. For instance, such optical communication device is the master device 110.

According to the shown architecture, the master device 110 comprises the following components interconnected by a communications bus 210: a processor, microprocessor, microcontroller or CPU (Central Processing Unit) 200; a RAM (Random-Access Memory) 201; a ROM (Read-Only Memory) 202; a device 203 adapted to read information stored on storage means; a first communication interface 204, aiming at being connected to the spectral splitter device 120 for transmitting and receiving optical signals; and, a second communication interface 205, aiming at being connected to the core or metropolitan network.

CPU 200 is capable of executing instructions loaded into RAM 201 from ROM 202 or from any other storage means. After the master device 110 has been powered on, CPU 200 is capable of reading instructions from RAM 201 and executing these instructions. The instructions form one computer program that causes CPU 200 to perform some or all of the steps of the algorithms described hereafter with regard to FIGS. 4 to 7.

It can be noted that the slave devices 141, 142, 143 may also be implemented on the basis of the architecture schematically shown on FIG. 2.

Any and all steps of the algorithms described hereafter with regard to FIGS. 4 to 7 may be implemented in software by execution of a set of instructions or program by a programmable computing machine, such as a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3A schematically represents a signal attenuation of an optical band-pass filter of the passive optical network. Frequency is represented as abscissa (horizontal axis) and attenuation is represented as ordinate (vertical axis).

The passband of the optical band-pass filter is centred at the nominal frequency $f_0$. The attenuation shows a flat top 300 between the low cut-off frequency $f_0-\epsilon$ and the high cut-off frequency $f_0+\epsilon$, the width of the flat top being equal to $2\epsilon$. Between the low cut-off frequency $f_0-\epsilon$ and the high cut-off frequency $f_0+\epsilon$, it can be considered that no attenuation occurs.

The attenuation shows a rising edge 301 for frequencies lower than the low cut-off frequency $f_0-\epsilon$ and a falling edge for frequencies higher than the high cut-off frequency $f_0+\epsilon$. For flat-top filters, the slopes of the rising edge and of the falling edge are abrupt, which means that the attenuation may vary from minimum to maximum within a short frequency range. It is considered that a slope of the rising edge and of the falling edge is abrupt when the absolute value of the slope has a magnitude of at least 500 dB/nm.

Therefore, when a carrier frequency of an optical signal is in the frequency range of the flat-top 300, no attenuation of the signal occurs. But when the carrier frequency of the optical signal is close to the low cut-off frequency $f_0-\epsilon$ or to the high cut-off frequency $f_0+\epsilon$, a slight variation of temperature may imply a slight frequency shift, which then may imply a significant change in the attenuation of the optical signal.

FIG. 3B schematically represents signal temporal shapes of an impulse response of the optical band-pass filter. Time is represented as abscissa (horizontal axis) and signal strength is represented as ordinate (vertical axis).

Let's consider an optical band-pass filter having the following characteristics: an attenuation of 0.1 dB at 10 GHz, an attenuation of 3 dB at 7.5 GHz and 12.5 GHz, and slopes of 850 dB/nm beyond these values.

The shape 310 represents the signal temporal shape of the impulse response of the optical band-pass filter, when the carrier frequency of the optical signal matches the nominal frequency $f_0$ of the optical band-pass filter. The shape 310 shows an extreme around 0.2 ns from the beginning of the reception of the symbol.

The shape 320 represents the signal temporal shape of the impulse response of the optical band-pass filter, when the frequency shift between the carrier frequency of the optical signal and the nominal frequency $f_0$ of the optical band-pass filter equals to 2 GHz. The shape 320 shows an extreme around 0.3 ns from the beginning of the reception of the symbol.

The shape 330 represents the signal temporal shape of the impulse response of the optical band-pass filter, when the frequency shift between the carrier frequency of the optical signal and the nominal frequency $f_0$ of the optical band-pass filter equals to 4 GHz. The shape 330 shows an extreme around 0.35 ns from the beginning of the reception of the symbol.

The shape 340 represents the signal temporal shape of the impulse response of the optical band-pass filter, when the frequency shift between the carrier frequency of the optical signal and the nominal frequency $f_0$ of the optical band-pass filter equals to 6 GHz. The shape 340 shows an extreme around 0.4 ns from the beginning of the reception of the symbol.

The shapes 310, 320, 330 and 340 show extremes, which are maximum signal strength, around respectively 0.3 ns, 0.35 ns and 0.4 ns. Other shapes may be obtained, for instance according to the waveform of the signal transmitted via the optical band-pass filter.

Such shapes may present more extremes, also referred to as local extremes, as present for instance in shapes 330 and 340.

It can then be understood that the signal temporal shape varies with the frequency shift between the carrier frequency of the optical signal and the nominal frequency $f_0$ of the optical band-pass filter. It can also be understood that the time of occurrence of an extreme of signal strength, within the symbol duration, varies with the frequency shift between the carrier frequency of the optical signal and the nominal frequency $f_0$ of the optical band-pass filter.

FIG. 4 schematically represents a first algorithm for determining whether the configuration of the optical transmission interface of the first device has to be adjusted.

In a step S401, the second device samples an optical signal received from the first device via the optical band-pass filter.

In a following step S402, the second device detects extremes of signal strength in at least two successive symbols of the optical signal. In a particular embodiment, the second device detects at least one extreme of signal strength in each symbol of the optical signal. The second device then determines instants at which said extremes occur.

In a following step S403, the second device determines time periods between detected extremes of signal strength between successive symbols of the optical signal received from the first device via the optical band-pass filter. In a variant, the step S403 is performed by the monitoring device, on the basis of information provided by the second device indicating the instants at which said extremes occur.

In a particular embodiment, the detected extremes are the signal strength maximum values for the respective symbols.

Then, the second device, or the monitoring device, determines whether a time drift exists between the occurrences of the extremes of signal strength. To achieve this, the second device, or the monitoring device, checks whether the time periods between the occurrences of the extremes of signal strength are stable or not, by comparing said time periods. At least three successive symbols are therefore needed in order to obtain at least two periods between occurrences of signal strength extremes for the comparison. Two successive symbols are however sufficient to determine whether a time drift exists, when the time period between said occurrences of the extremes of signal strength in the signal as transmitted by the first device is a priori known.

When the time periods between occurrences of signal strength extremes are stable, it means that there is no variation between the carrier frequency of the optical signal and the nominal frequency of the optical band-pass filter. When these time periods decrease over time, it means that the carrier frequency of the optical signal gets closer to the nominal frequency of the optical band-pass filter. When these time periods increase over time, it means that the carrier frequency of the optical signal gets further from the nominal frequency of the optical band-pass filter.

In one embodiment, the second device determines whether a time drift exists between the occurrences of the extremes of signal strength, and provides an information of such a time drift to the monitoring device.

In other words, in the step S403, the monitoring device obtains information representative of a time drift between successive symbols of the optical signal. The monitoring device obtains such information directly from the second device, or from information representative of the aforementioned time periods provided by the second device, or from information representative of the aforementioned instants at which extremes are detected by the second device.

In a following step S404, the monitoring device checks whether a time drift is detected and accordingly determines whether the configuration of the optical transmission interface of the first device has to be adjusted.

In a preferred embodiment, the configuration of the optical transmission interface of the first device has to be adjusted when the time drift shows a time period increase between extremes of signal strength. It means that if the time drift shows a time period decrease between extremes of signal strength, no adjustment of the configuration of the optical transmission interface of the first device may be performed, as it means that the carrier frequency of the optical signal gets closer to the nominal frequency of the optical band-pass filter. If it is detected that the time drift shows such time period increase, a step S406 is performed; otherwise, a step S405 is performed. In the step S405, the monitoring device determines that the configuration of the optical transmission interface of the first device doesn't need to be adjusted; whereas, in the step S406, the monitoring device determines that the configuration of the optical transmission interface of the first device has to be adjusted.

Following the step S406, the monitoring device instructs the first device to adjust the configuration of its optical transmission interface. As the monitoring device may not be aware whether the carrier frequency should be increased or decreased, the monitoring device may indicate a default direction in which the carrier frequency should be tuned. Then, once the first device has modified the configuration of its optical transmission interface, the monitoring device checks whether a time drift occurs in the appropriate direction, i.e. the time periods between extremes of signal strength of successive symbols decrease. If not, the monitoring device instructs the first device to adjust the configuration of its optical transmission interface in the other direction.

When the monitoring device instructs the first device to effectively adjust the configuration of its optical transmission interface, the monitoring device is referred herein to as configuring device.

In order to detect the extremes of signal strength in the symbols of the optical signal, the second device performs oversampling in the step S401.

In a variant, the first device successively transmits plural copies of plural symbols, each copy being delayed from the preceding copy by a submultiple of the symbol duration. This delay can be achieved by using delay lines. Then, the second device performs sampling of the plural copies and the second device detects at least one extreme of signal strength among said plural copies for each symbol. According to this arrangement, time period between the beginning of the transmission of a copy and the beginning of the transmission of the immediately following copy equals to a symbol duration increased by said submultiple of the symbol duration. Therefore, the second device samples the copies of a same symbol at different instants and therefore catches the signal strength at different instants, which allows obtaining a discrete view of the signal temporal shape for the symbol without using oversampling.

In another variant, the first device successively transmits plural copies of plural symbols. Then, the second device performs sampling of the plural copies, each sampling operation for one copy being delayed compared to the sampling operation of a preceding copy by a submultiple of the symbol duration. This delay can be achieved by using delay lines. According to this arrangement too, the second device samples the copies of a same symbol at different instants and therefore catches the signal strength at different instants, which allows obtaining a discrete view of the signal temporal shape for the symbol without using oversampling.

In the last two variants, the second device may transmit to the monitoring device information indicating, among a sequence of symbol copies, the index of the copy containing the extreme of signal strength detected by the second device. By transmitting this index, the monitoring device being aware of the number of copies per sequence and being aware of the delay applicable between each couple of copies, the monitoring device is able to determine at which instant the extreme occurred. This allows limiting the amount of information exchanged between the second device and the monitoring device, thus reducing the transmission resource consumption.

FIG. 5 schematically represents a second algorithm for determining whether a configuration of the optical transmission interface of the first device has to be adjusted. In the context of FIG. 5, the second device comprises an ADC (Analogue-to-Digital Converter) for converting the optical signal in an analogue form into a digital form, which is driven using a CDR (Clock and Data Recovery) unit. In the following, only the clock recovery mechanism of the CDR is used. Furthermore, variations of control voltage of an oscillator of the clock recovery unit are detected and handled in the detailed description of FIG. 5 hereafter; however, the same principles remain for a control voltage of the clock recovery unit.

In a step S501, the second device detects transient variations of the control voltage of the oscillator of the clock recovery unit, for example the charge pump voltage a phase-locked loop. Such transient variations are representative of frequency changes in the received transitions of the optical signal. In other words, such transient variations are representative of the variations of the time period between successive transitions in the received optical signal.

In a step S502, the second device determines a time drift from the detected transient variations of the charge pump voltage. In a variant, the step S502 is performed by the monitoring device, on the basis of information provided by the second device indicating that said transient variations of the charge pump voltage occur. The second device, or the monitoring device, determines whether a time drift exists by checking whether the charge pump voltage is stable or not. It there is a transient change in the charge pump voltage, its means that there is a frequency shift between the carrier frequency of the optical signal and the nominal frequency of the optical band-pass filter.

When the charge pump voltage is stable, it means that there is no variation between the carrier frequency of the optical signal and the nominal frequency of the optical band-pass filter. Whether the charge pump voltage transiently increases or transiently decreases compared to a preceding value furthermore indicates whether the carrier frequency of the optical signal gets closer or respectively further compared to the nominal frequency of the optical band-pass filter. Alternatively, whether the charge pump voltage transiently increases or transiently decreases compared to a preceding value indicates whether the carrier frequency of the optical signal gets further or respectively closer compared to the nominal frequency of the optical band-pass filter.

In one embodiment, the second device determines whether a time drift exists, and provides an information of such a time drift to the monitoring device.

In other words, in the step S502, the monitoring device obtains information representative of a time drift between successive symbols of the optical signal. The monitoring device obtains such information directly from the second device, or from information representative of the aforementioned charge pump voltage transient variations provided by the second device.

In a following step S503, the monitoring device checks whether a time drift is detected and accordingly determines whether the configuration of the optical transmission interface of the first device has to be adjusted.

In a preferred embodiment, the configuration of the optical transmission interface of the first device has to be adjusted when the time drift is represented by a transient increase of the charge pump voltage. It means that, if the time drift is represented by a transient increase of the charge pump voltage, no adjustment of the configuration of the optical transmission interface of the first device may be performed, as it means that the carrier frequency of the optical signal gets closer to the nominal frequency of the optical band-pass filter. If it is detected that the time drift is represented by a transient increase of the charge pump voltage, a step S505 is performed; otherwise, a step S504 is performed. In the step S504, the monitoring device determines that the configuration of the optical transmission interface of the first device doesn't need to be adjusted; whereas, in the step S505, the monitoring device determines that the configuration of the optical transmission interface of the first device has to be adjusted. Following the step S505, the monitoring device instructs the first device to adjust the configuration of its optical transmission interface.

FIG. 6 schematically represents a first algorithm for configuring the optical transmission interface of the first device.

As the method based on time drift detection detailed hereinbefore allows detecting that the difference between the carrier frequency of the optical signal and the nominal frequency of the optical band-pass filter varies, it is desirable to at least once tune the optical transmission interface of the first device so that the carrier frequency of the optical signal matches the bandwidth or passband of the optical band-pass filter. The algorithm of FIG. 6 provides a first approach, whereas the algorithm of FIG. 7 provides a second approach.

In a step S601, the second device samples an optical signal received from the first device via the optical band-pass filter.

In a following step S602, the second device determines information representative of a signal temporal shape for one symbol of the sampled optical signal. It means that, for the concerned symbol, the second device determines a set of instants in the duration of the symbol and associates with these instants corresponding values of the signal strength. The configuring device obtains said information from the second device.

In order to determine the signal temporal shape for the symbol, the second device performs for instance oversampling in the step S601.

In a following step S603, the configuring device compares the signal temporal shape with a set of predefined signal temporal shapes. In other words, using the illustrative example of FIG. 3B, the configuring device has at its disposal information representative of various candidate signal temporal shapes corresponding to the shapes 310, 320, 330, 340, which may be observed by the second device when receiving the symbol. The information representative of the various candidate signal temporal shapes are actually representative of a convolution of the temporal shape of the impulse response of the optical band-pass filter shown in FIG. 3B with the waveform actually used by the first device to transmit the optical signal to the second device.

The configuring device determines which predefined candidate shape best matches the actual observation performed by the second device when receiving the symbol. As shown in FIG. 3B, knowing the signal temporal shape for the received symbol, the frequency shift between the nominal frequency of the optical band-pass filter and the actual carrier frequency of the optical signal transmitted by the first device to the second device may be deduced. Such candidate shapes are for instance patterns stored in a LUT (Look-Up Table) in correspondence with the frequency shift between said nominal frequency and said carrier frequency.

Selecting the predefined candidate shape that best matches the actual observation performed by the second device is for instance performed as follows. The monitoring device having values of the actual signal strength at predefined time intervals in the symbol duration, the monitoring device compares the actual signal strength for one interval with the signal strength estimated for the candidate shapes for the same interval. The monitoring device then selects the subset of candidate shapes for which the estimated signal strength value matches the actual signal strength for this interval, and reiterates the selection process for another interval for the selected candidate shapes, until only one candidate shape remains.

Selecting the predefined candidate shape that best matches the actual observation performed by the second device may also be performed by comparing local extremes or inflection points of the actual observation performed by the second device with local extremes or inflection points of the candidate shapes.

In a following step S604, the configuring device checks whether there is a frequency shift between the nominal frequency of the optical band-pass filter and the actual carrier frequency of the optical signal transmitted by the first device to the second device. In other words, referring to FIG. 3B, if the actual signal temporal shape for the received symbol corresponds to the shape 310, there is no frequency shift and a step S606 is performed. Otherwise, if the actual signal temporal shape for the received symbol corresponds to either the shape 320, 330 or 340, there is some frequency shift and a step S605 is performed, in which frequency adjustment is requested. The configuring device may determine the extent to which the configuration of the optical transmission interface of the first device needs to be adjusted thanks to the frequency shift, between the carrier frequency and the nominal frequency of the optical band-pass filter, corresponding to said candidate shape. This information may be taken into account when adjusting the configuration of the optical transmission interface of the first device.

The configuring device may also decide that some frequency shift, below a predefined threshold, is acceptable. In this case, referring again to FIG. 3B, if the actual signal temporal shape for the received symbol corresponds to either the shape 310 or 320, the step S606 is performed, and otherwise, the step S605 is performed.

In the step S605, the configuring device instructs the first device to adjust the configuration of its optical transmission interface, as already mentioned with regard to FIG. 4. The configuring device therefore configures the optical transmission interface of the first device, on the basis of the information representative of the signal temporal shape corresponding to a symbol of the optical signal received by the second device, from the first device, via the optical band-pass filter.

In the step S606, the monitoring process based on time drift detection, as already detailed with regard to FIGS. 4 and 5 is implemented. The configuration of the optical transmission interface of the first device can thus be adjusted according to the detection of such a time drift.

FIG. 7 schematically represents a second algorithm for configuring the optical transmission interface of the first device.

In a step S701, the second device receives an optical signal from the first device via the optical band-pass filter.

In a following step S702, the second device determines a signal energy level over an integration period. For instance, the integration period represents the duration of one symbol of the optical signal.

In a following step S703, the second device, or the configuring device, compares the determined signal energy level and a signal energy level determined over a preceding integration period. The second device then provides this information to the configuring device. In a variant, the second device provides to the configuring device an information representative of the signal energy level determined in the step S702, and the step 703 is performed by the configuring device.

In other words, the configuring device obtains an information indicating whether an energy level of the optical signal received by the second device over an integration period increased, decreased or was stable when comparing said energy level and an energy level of the optical signal received by the second device over a preceding integration period.

In a following step S704, the configuring device determines whether the energy level is stable between the two aforementioned integration periods. If the energy level is stable, a step S705 is performed; otherwise, a step S706 is performed.

In the step S706, the configuring device instructs the first device to adjust the configuration of its optical transmission interface. For instance, the configuration of the optical transmission interface is adjusted so that the carrier frequency is increased or decreased by a predefined value.

In the step S705, the configuring device stops the adjustment of the configuration of the optical transmission interface of the first device. When the algorithm reaches the step S705, it means that the carrier frequency is in the bandwidth or passband of the optical band-pass filter. The configuring device may however request a further adjustment of the configuration of the optical transmission interface of the first device; for instance the configuration of the optical transmission interface is adjusted so that the carrier frequency is increased or decreased by a predefined value. This allows getting the carrier frequency closer to the nominal wavelength of the optical band-pass filter, as when reaching the step S705 for the first time may mean that the carrier frequency is close to one of the cut-off frequencies of the optical band-pass filter.

The configuring device therefore configures the optical transmission interface of the first device, on the basis of the information indicating whether the signal energy level over an integration period increased, decreased or was stable when comparing said energy level and a signal energy level over a preceding integration period.

In a following step S707, the monitoring process based on time drift detection, as already detailed with regard to FIGS. 4 and 5, is implemented. The configuration of the optical transmission interface of the first device can thus be adjusted according to the detection of such a time drift.

FIG. 8 schematically represents a third algorithm for configuring the optical transmission interface of the first device.

As for the algorithm detailed hereinbefore with regard to FIGS. 6 and 7, the algorithm of FIG. 8 aims at, to at least once, tuning the optical transmission interface of the first device so that the carrier frequency of the optical signal matches the bandwidth or passband of the optical band-pass filter. Signal attenuation can again be used to coarsely tune the carrier frequency.

The principle of the algorithm of FIG. 8 is to scan a carrier frequency range, measure an energy level for each carrier frequency selected in the frequency range and select a configuration of the optical transmission interface of the first device. In other words, the configuring device obtains measurements of energy level of the optical signal received by the second device over an integration period, for plural carrier frequencies, and configures the optical transmission interface of the first device, on the basis of these measurements.

In a step S801, the configuring device instructs the first device to perform an initial setup of the configuration of its optical transmission interface.

In a following step S802, the second device receives an optical signal from the first device via the optical band-pass filter.

In a following step S803, the second device measures a signal energy level over an integration period. For instance, the integration period represents the duration of one symbol of the optical signal. This measurement is provided by the second device to the configuring device.

In a following step S804, the configuring device checks whether the whole carrier frequency range has been parsed, i.e. whether the scan of the carrier frequency range is complete. It has to be understood that the scan is considered complete, when the measures have been obtained for a predefined set of carrier frequencies within the frequency range. If the scan is complete, a step S806 is performed; otherwise, a step S805 is performed, in which the configuring device instructs the first device to modify the setup of the configuration of its optical transmission interface, in order to select another carrier frequency within the carrier frequency range.

In the step S806, the configuring device determines the suitable configuration of the optical transmission interface of the first device, on the basis of the measurements of energy level. The configuring device, on the basis of the measurements of energy level, is able to determine the actual characteristics of the optical band-pass filter, and more particularly the frequencies defining the flat-top 300 of the optical band-pass filter. The configuration device is therefore able to estimate the configuration of the optical transmission interface of the first device that would involve a carrier frequency matching the nominal frequency of the optical band-pass filter. The configuring device then instructs the first device to perform a setup of the configuration of its optical transmission interface accordingly.

In a following step S807, the monitoring process based on time drift detection, as already detailed with regard to FIGS. 4 and 5, is implemented. The configuration of the optical transmission interface of the first device can thus be adjusted according to the detection of such a time drift.

In a particular embodiment, the monitoring process based on time drift detection is performed using symbols transmitted by the first device during communications with the second device. It means that when communications are setup and take place from the first device to the second device, no specific symbol is required for performing the monitoring. When idle communication periods occur, the monitoring device detects that no information for enabling obtaining the information representative of the signal temporal shape has been received during a predetermined time period from the second device. A timeout counter may be used to achieve this, the counter being reset each time the monitoring device receives from the second device information representative of the time drift. When the timeout expires, the monitoring device requests the first device to transmit to the second device at least one specific symbol via the optical band-pass filter. The symbol is specific in that it doesn't correspond to a usual communication from the first device to the second device. It only aims at enabling the second device to provide the monitoring device with information enabling the determining of the time drift and then determine whether the configuration of the optical transmission interface of the first device has to be adjusted.

The invention claimed is:

1. A method for determining whether a configuration of an optical transmission interface of a first device has to be adjusted for transmitting an optical signal to a second device, the method comprising a monitoring device performing:

receiving, from the second device, information representative of instants at which extremes of signal strength are detected by the second device in at least two successive symbols of the optical signal received by the second device from the first device, wherein the optical signal is transmitted by the first device to the second device via an optical band-pass filter, the second device includes an optical reception interface configured to receive optical signals output by said optical band-pass filter and transmitted by the first device on a carrier frequency when said carrier frequency is in the passband of the optical band-pass filter;

determining at least one time period between said instants at which the extremes of signal strength are detected in the at least two successive symbols of the optical signal;

obtaining information representative of a time drift on the basis of the determined at least one time period, said time drift being due to a frequency shift between the carrier frequency and a nominal frequency of the optical pass-band filter, the information representative of the time drift being obtained by checking whether the at least one time period decreases compared with a reference time period duration, remains stable compared with a reference time period duration, or increases compared with a reference time period duration;

determining whether the configuration of the optical transmission interface of the first device has to be adjusted, on the basis of the information representative of the time drift; and adjusting said configuration when the time drift exhibits a time period increase between the extremes of signal strength.

2. The method according to claim 1, wherein the second device performs oversampling of the at least two successive symbols of the optical signal received by the second device, from the first device, via the optical band-pass filter.

3. The method according to claim 1, wherein the first device successively transmits plural copies of each symbol of the at least two successive symbols, said symbols having the same duration, each copy of each symbol being delayed from the immediately preceding copy of said symbol, if any, by a submultiple of the duration of the symbols duration, wherein the second device performs, for each symbol, sampling of the plural copies of said symbol in the optical signal received by the second device from the first device via the optical band-pass filter, and wherein the second device performs detecting detects, for each symbol, at least one extreme of signal strength among the plural copies of said symbol.

4. The method according to claim 1, wherein the first device successively transmits plural copies of the at least two successive symbols, said symbols having the same duration, wherein the second device performs sampling operations on the plural copies in the optical signal received by the second device from the first device via the optical band-pass filter, each sampling operation for one copy among the plural copies being delayed compared to the sampling operation of the immediately preceding copy among the plural copies by a submultiple of the duration of the symbols, and wherein the second device detects, for each symbol, at least one extreme of signal strength among the plural copies of said symbol.

5. The method according to claim 3, wherein the monitoring device receives from the second device information indicating, among a sequence of the plural copies of one symbol among the at least two successive symbols, an index of a copy among the plural copies containing an extreme of signal strength detected by the second device.

6. The method according to claim 1, wherein said extremes are signal strength maximum values for each symbol of the at least two successive symbols.

7. The method according to claim 1, wherein the monitoring device further performs:
- detecting that no information has been received from the second device during a predetermined time period for obtaining the information representative of the time drift; and
- requesting the first device to transmit to the second device at least another symbol via the optical band-pass filter.

8. A method for determining whether a configuration of an optical transmission interface of a first device has to be adjusted for transmitting an optical signal to a second device, the method comprising a monitoring device performing:
- receiving, from the second device, information representing that a control voltage of an oscillator of a clock recovery unit driving an analogue-to-digital converter of the second device transiently varies when the second device receives the optical signal from the first device, wherein the optical signal is transmitted by the first device to the second device via an optical band-pass filter, the second device includes an optical reception interface configured to receive optical signals output by said optical band-pass filter and transmitted by the first device on a carrier frequency when said carrier frequency is in the passband of the optical band-pass filter;
- obtaining information representative of a time drift on the basis of transient variations in the control voltage of the oscillator of the clock recovery unit, said time drift being due to a frequency shift between the carrier frequency and a nominal frequency of the optical pass-band filter, the information of the time drift being obtained by checking whether the transient variations in the control voltage decrease as a function of time, remain stable as a function of time, or increase as a function of time;
- determining whether the configuration of the optical transmission interface of the first device has to be adjusted, on the basis of the information representative of the time drift; and
- adjusting said configuration when the time drift is indicative of an increase or a decrease in the transient variations in the control voltage as a function of time, according to whether the increase or respectively the decrease corresponds to the carrier frequency going away from the nominal frequency of the optical pass-band filter.

9. The method according to claim 8, wherein the monitoring device further performs:
- detecting that no information has been received from the second device during a predetermined time period for obtaining the information representative of the time drift; and
- requesting the first device to transmit to the second device at least another symbol via the optical band-pass filter.

10. The method according to claim 1, wherein the monitoring device performs, before obtaining the information representative of the time drift:
- obtaining information representative of a signal temporal shape of one symbol of the optical signal, which is received by the second device from the first device via the optical band-pass filter before said at least two successive symbols;
- determining whether the configuration of the optical transmission interface of the first device has to be adjusted, on the basis of said information representative of the signal temporal shape by checking whether said signal temporal shape exhibits a frequency shift compared to a predetermined signal shape; and
- adjusting said configuration when the signal temporal shape exhibits the frequency shift.

11. The method according to claim 1, wherein the monitoring device performs, before obtaining the information representative of the time drift:
- obtaining information indicating whether an energy level of an optical signal of the optical signals received by the second device over an integration period has increased, decreased, or remained stable when comparing said energy level and another energy level of said optical signal received by the second device over another integration period preceding said integration period; and
- determining whether the configuration of the optical transmission interface of the first device has to be adjusted, on the basis of said information by checking whether said signal temporal shape exhibits a frequency shift compared to a predetermined signal shape; and
- adjusting said configuration when said energy level over said integration period has increased.

12. The method according to claim 11, wherein the monitoring device performs:
- obtaining measurements of energy level of an optical signal of the optical signals received by the second device over the integration period, for plural carrier frequencies; and
- adjusting the configuration of the optical transmission interface of the first device on the basis of said measurements.

13. A monitoring device for determining whether a configuration of an optical transmission interface of a first device has to be adjusted for transmitting an optical signal to a second device, the monitoring device comprising processing circuitry configured to:
- receive, from the second device, information representative of instants at which extremes of signal strength are detected by the second device in at least two successive symbols of the optical signal received by the second device from the first device, wherein the optical signal is transmitted by the first device to the second device via an optical band-pass filter, the second device includes an optical reception interface configured to receive optical signals output by said optical band-pass filter and transmitted by the first device on a carrier frequency when said carrier frequency is in the passband of the optical band-pass filter;
- determine at least one time period between said instants at which the extremes of signal strength are detected in the at least two successive symbols of the optical signal;
- obtain information representative of a time drift on the basis of the determined at least one time period, said time drift being due to a frequency shift between the carrier frequency and a nominal frequency of the optical pass-band filter, the information representative of the time drift being obtained by checking whether the at least one time period decreases compared with a reference time period duration, remains stable compared with a reference time period duration, or increases compared with a reference time period duration;

determine whether the configuration of the optical transmission interface of the first device has to be adjusted, on the basis of the information representative of the time drift; and adjust said configuration when the time drift exhibits a time period increase between the extremes of signal strength.

14. A monitoring device for determining whether a configuration of an optical transmission interface of a first device has to be adjusted for transmitting an optical signal to a second device, the monitoring device comprising processing circuitry configured to:

receive, from the second device, information representing that a control voltage of an oscillator of a clock recovery unit driving an analogue-to-digital converter of the second device transiently varies when the second device receives the optical signal from the first device, wherein the optical signal is transmitted by the first device to the second device via an optical band-pass filter, the second device includes an optical reception interface configured to receive optical signals output by said optical band-pass filter and transmitted by the first device on a carrier frequency when said carrier frequency is in the passband of the optical band-pass filter;

obtain information representative of a time drift on the basis of transient variations in the control voltage of the oscillator of the clock recovery unit, said time drift being due to a frequency shift between the carrier frequency and a nominal frequency of the optical pass-band filter, the information of the time drift being obtained by checking whether the transient variations in the control voltage decrease as a function of time, remain stable as a function of time, or increase as a function of time;

determine whether the configuration of the optical transmission interface of the first device has to be adjusted, on the basis of the information representative of the time drift; and adjust said configuration when the time drift is indicative of an increase or a decrease in the transient variations in the control voltage as a function of time, according to whether the increase or respectively the decrease corresponds to the carrier frequency going away from the nominal frequency of the optical pass-band filter.

\* \* \* \* \*